G. KOMAREK.
FEEDER FOR BRIQUET MACHINES.
APPLICATION FILED SEPT. 3, 1918.

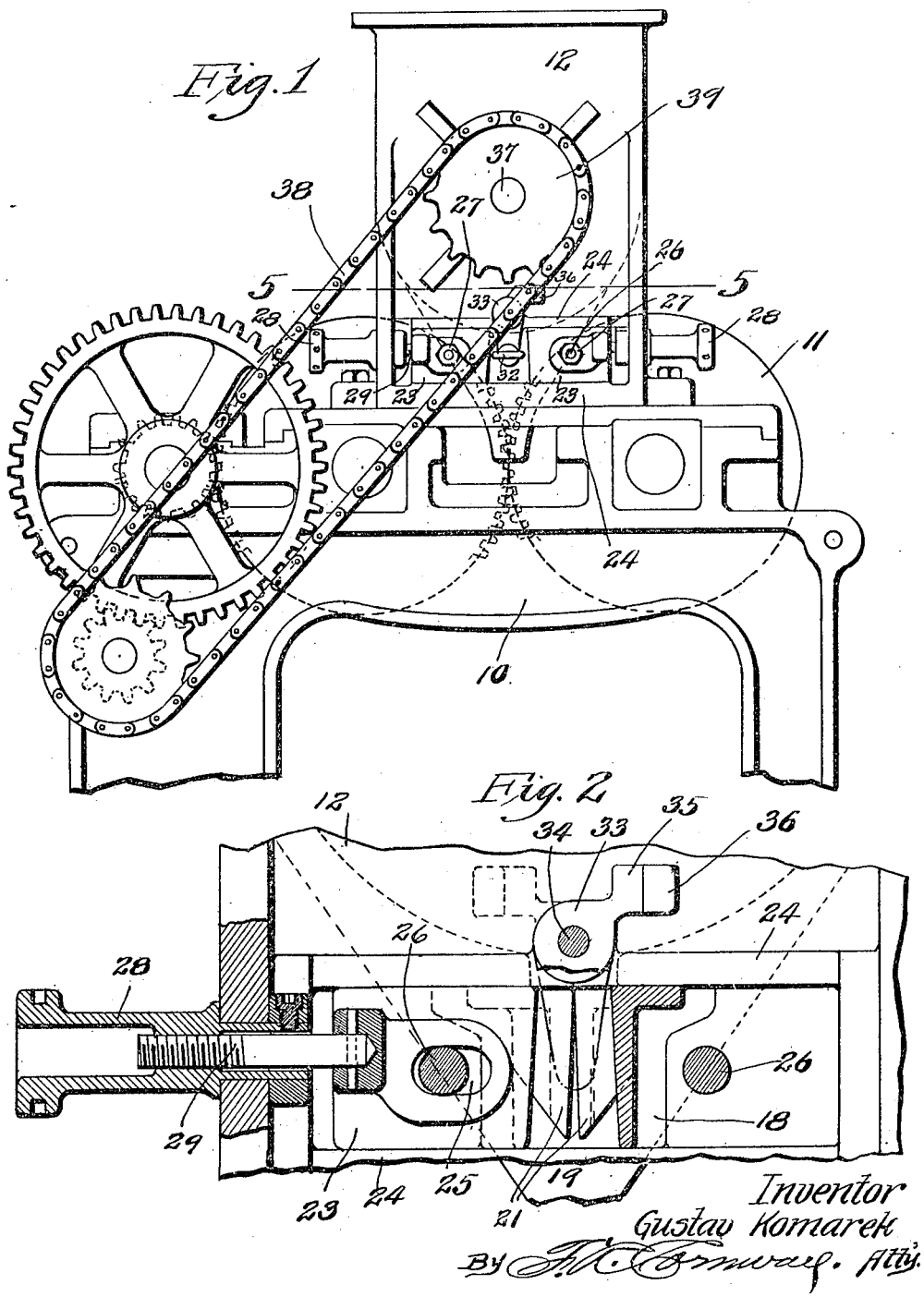

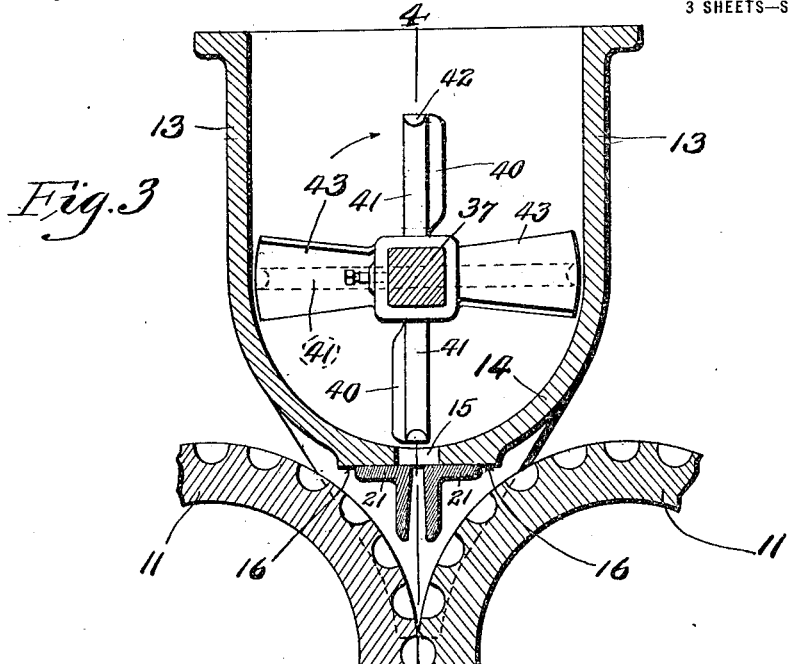
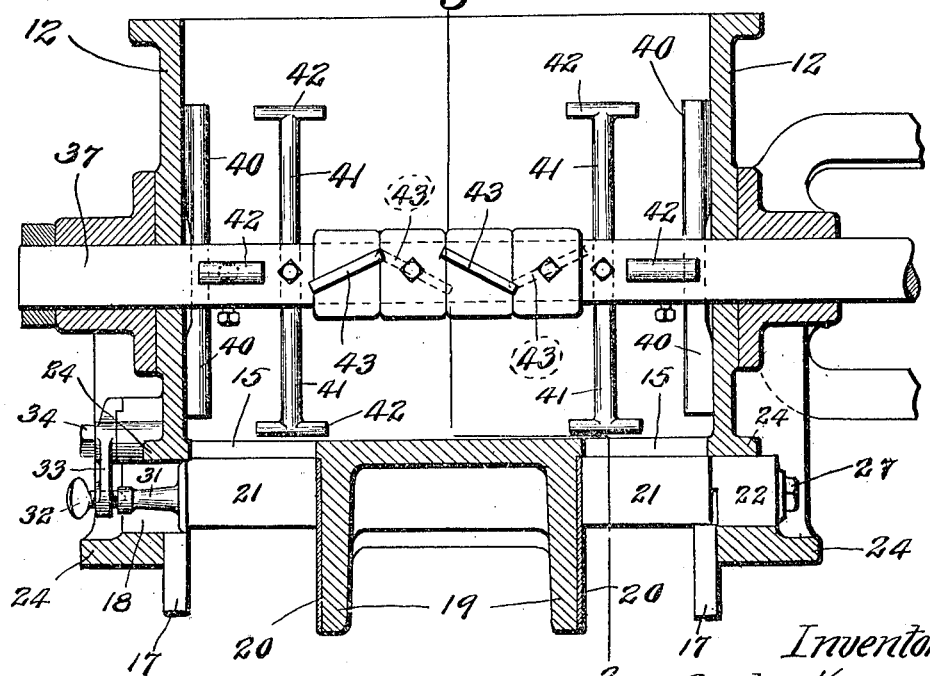

1,292,483.

Patented Jan. 28, 1919.
3 SHEETS—SHEET 3.

Inventor
Gustav Komarek

UNITED STATES PATENT OFFICE.

GUSTAV KOMAREK, OF CHICAGO, ILLINOIS, ASSIGNOR TO ST. LOUIS BRIQUETTE MACHINE COMPANY, OF ST. LOUIS, MISSOURI, A CORPORATION OF MISSOURI.

FEEDER FOR BRIQUET-MACHINES.

1,292,483.      Specification of Letters Patent.      Patented Jan. 28, 1919.

Application filed September 3, 1918. Serial No. 252,390.

*To all whom it may concern:*

Be it known that I, GUSTAV KOMAREK, a citizen of the United States, residing at Chicago, Illinois, have invented a certain new and useful Improvement in Feeders for Briquet-Machines, of which the following is a full, clear, and exact description, such as will enable others skilled in the art to which it appertains to make and use the same, reference being had to the accompanying drawings, forming part of this specification.

My invention relates generally to briqueting machinery and more particularly to a material feeder for that type of briquet press known as a Belgian roll press.

The principal objects of my invention are, to provide a relatively simple and easily operated material feeder which can be readily combined with Belgian roll presses; to provide a material briqueting material feeder wherein all of the operating parts are carried by the hopper or feed box; to provide simple and easily adjusted means for regulating the size of the openings from the feed box into the depression or throat formed between the rolls of the press; to provide a feed box wherein the entire body of briqueting material is constantly agitated and moved toward the outlet openings, thereby insuring an even and uniform feed of the material to the rolls of the press; to provide a material feeding box wherein the operating parts can be readily assembled or removed, thereby greatly facilitating the work incident to repairs or renewal of parts; and further, to provide a construction which will very effectively perform its intended functions and which will be wholly automatic in operation and requiring no attention on the part of an attendant after the adjustable parts have been properly set.

With the foregoing and other objects in view, my invention consists in certain novel features of construction and arrangement of parts, hereinafter more fully described and claimed, and illustrated in the accompanying drawings, in which—

Figure 1 is a side elevational view of the upper portion of a Belgian press and showing a material feeding box of my improved construction applied thereto.

Fig. 2 is a fragmentary view partly in side elevation and partly in section and showing the means utilized for adjusting the size of one of the outlet openings of the box.

Fig. 3 is a vertical cross section taken approximately on the line 3—3 of Fig. 4.

Fig. 4 is a vertical section taken approximately on the line 4—4 of Fig. 3.

Figure 5:
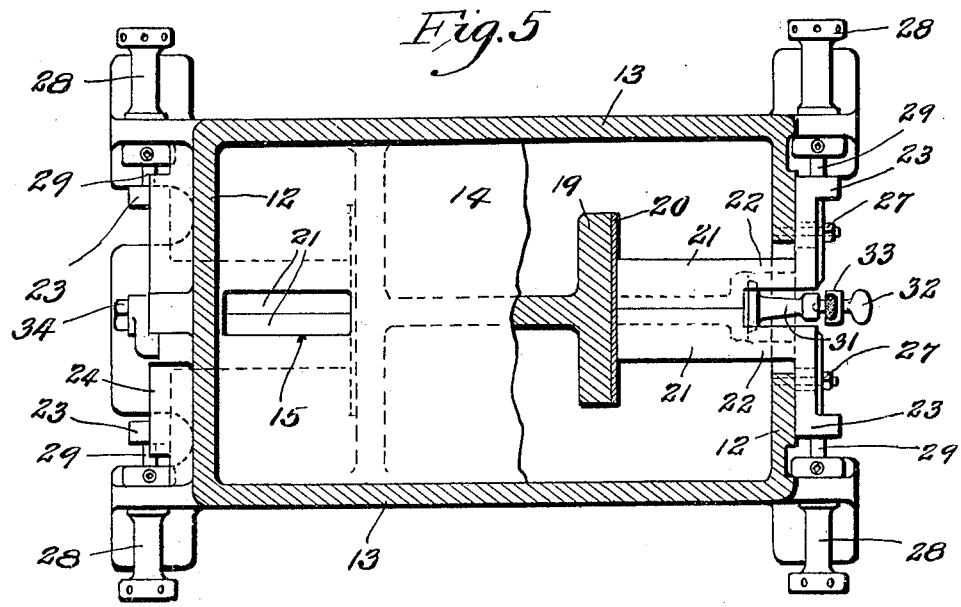
Fig. 5 is an enlarged horizontal section taken approximately on the line 5—5 of Fig. 1 with a portion of the bottom of the box broken away.

Referring by numerals to the accompanying drawings, 10 designates the frame of an ordinary Belgian roll press, the same being equipped with pairs of coöperating pressure rolls 11, the peripheries of which are provided with mold cavities in which the briquets are formed and said rolls being driven through the medium of properly arranged gearing. Fixed on top of the frame of the press and transversely arranged thereupon above the pairs of rolls 11 is my improved material feeding box, the body of which is integrally formed and comprises a pair of end walls 12 and side walls 13, the lower portions of which are united by a semi-circular or trough-shaped bottom 14. Formed in this trough-shaped bottom 14 adjacent to the end walls 12 are substantially rectangular openings 15 which are disposed directly above the throats formed between the pairs of pressure rolls 11 and the underface of the bottom 14 to the sides of these openings are flat and finished as designated by 16 in order to form bearing surfaces for parts of adjustable members which control the size of the openings 15 and which members are hereinafter more fully described.

Portions of the end walls 12 are extended a short distance below the trough-shaped bottom 14 as designated by 17 and centrally arranged in these depending portions are openings 18 which accommodate the outer portions of the adjustable members which control the size of openings 15.

Formed integral with the bottom 14 of the feed box and at the inner ends of the openings 15 are depending plates or walls 19 which occupy positions parallel with the end walls 12 and the outer faces of these plates or walls 19 are provided with wear or liner plates 20 of hardened metal.

There is a pair of adjustable members for controlling the size of each opening 15 and each pair is composed of a right and left-hand member. Each member is formed in a single piece and comprises an inverted L-shaped inner portion 21, the horizontal leg or web of which bears directly against the corresponding flat bearing surface 16. The vertical webs or legs of these inner members extend downwardly into the throat or V-shaped opening formed between the corresponding pair of pressure rolls 11. (See Fig. 3). The inner ends of the inverted L-shaped members fit tightly against the outer face of the corresponding plate 20 and the outer portions of said members 21 are provided with integrally formed outwardly projecting plates 22, the same being offset with respect to the vertical legs of said members and the outer ends of said plates 22 are provided with integrally formed plates 23, the latter being disposed at right angles to the bodies of the members and adapted to lie directly against the outer face of the corresponding end wall 12, (see Fig. 5,) and to slide between horizontally disposed ribs or flanges 24 which are formed on said end walls above and below the openings 18 therein.

Formed in each plate 23 is a horizontally disposed slot 25 and projecting therethrough is a stud bolt 26, the inner end thereof being seated in the end wall 12 and the outer end being threaded to receive a nut 27, which latter, when tightened, locks the member comprising the parts 21, 22, and 23 in its adjusted position.

The means utilized for adjusting the position of the member comprising the parts 21, 22 and 23 includes a sleeve or tubular nut 28, the same being mounted for rotary movement in a suitable bearing in a part of the feed box and said tubular nut engaging the threaded portion of a stud 29, the inner end of which latter is fixed in any suitable manner to the outer portion of the corresponding plate 23. By this construction, as sleeve or tubular nut 28 is rotated, the member comprising the parts 21, 22 and 23 will be moved toward or away from its companion member during which movement plate 23 slides between flanges 24.

Figure 6:
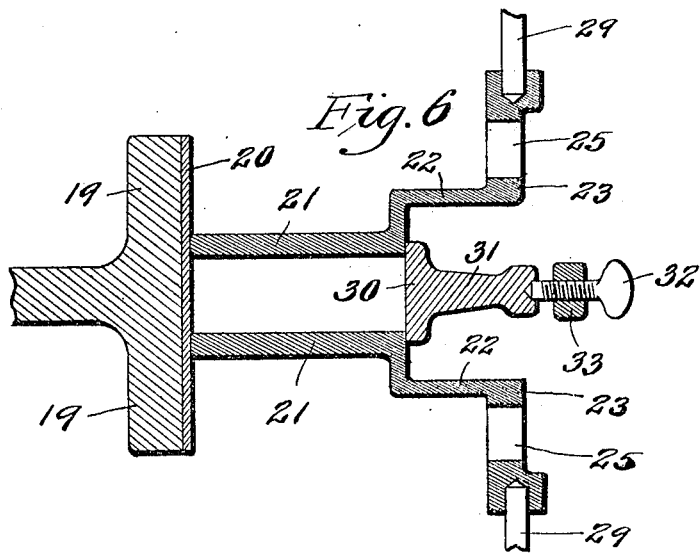
Fig. 6 is an enlarged horizontal section illustrating the construction of one of the outlet openings of the feed box.

A plate 30 is arranged between the offset plates 22 and bears directly against the outer ends of inverted L-shaped members 21, thereby forming a closure for the outer end of the passageway leading downwardly between said member 21. This closure plate 30 is provided with an integrally formed outwardly projecting stud 31 and bearing against the outer end of the latter is the inner end of a set screw 32, the same being carried by the lower end of a locking arm 33. The upper portion of this arm is fulcrumed on a stud bolt 34 and formed integral with and projecting upwardly and laterally from the upper portion of said arm is a finger 35 which is adapted to engage directly against a lug 36, the latter projecting outwardly from the end wall of the feed box. The construction just described serves to correctly position the set screw 32 with respect to the stud 31, for when finger 35 bears against lug 36, said set screw 32 will be in direct alinement with the stud 31, thereby enabling the operator to readily tighten the closure plate 30 against the outer ends of members 21. (See Fig. 6).

Journaled in suitable bearings formed in the end walls 12 of the feed box is a shaft 37, the same being driven in any suitable manner, preferably by means of a sprocket chain 38 passing over a sprocket wheel 39, the latter being fixed on one end of said shaft. Carried by said shaft within the box and bearing directly against the inner faces of the end walls 12 are arms or members 40 which perform the functions of scrapers to remove the briqueting material from the inner faces of said end walls and force said removed material toward the center of the box. Carried by the shaft adjacent to these scraping members and disposed directly above the outlet openings 15 are pairs of arms 41, the outer ends of which carry short cross arms or fingers 42 and these members serve to thoroughly stir or agitate the body of material which occupies the end portions of the feed box, thereby insuring uniform feed of said material through the outlet openings 15.

The central portion of shaft 37 is preferably made square or non-circular in cross section and carried thereby are paddles 43, the same being arranged in pairs with one pair on each side of the center of the shaft. These paddles are slightly inclined and disposed so that while in operation they will force the briqueting material from the center of the box in both directions toward its ends or toward the stirring arms 41.

The operation of my improved material feeder is obvious, for it will be readily understood that as shaft 37 rotates, the briqueting material will be thoroughly agitated within the box and moved toward the ends thereof, and said material will finally pass out through openings 15, thence downwardly between members 21 and thus be delivered directly into the throats formed between the pairs of pressure rolls 11.

The members 21 are adjusted in position by proper manipulation of the sleeves or tubular nuts 28 and after said members have been properly adjusted, they are locked in such positions by tightening nuts 27.

By providing a feed box having a semi-circular or trough-shaped bottom and arranging the adjustable members 21 on the underside of said bottom to the sides of the outlet openings 15, the briqueting material is maintained in a position very close to the pressure rolls and the material discharging from said box is delivered directly into the depression or throat between the rolls. This arrangement has decided advantages, for where the material feeding box is spaced apart from the pressure rolls, there is a tendency of the material to clog and feed unevenly with the result that the mold cavities in the pressure rolls are not always uniformly filled. The body of the feed box is formed in a single piece and all of the operating parts associated with the feeder are carried by the box, thereby greatly facilitating the work incident to the assembling of the box upon the press or its removal therefrom and likewise greatly facilitating the work incident to repairs or renewal of parts. The adjustable members associated with the outlet openings of the feed box can be easily and quickly shifted from one position to another and by slightly loosening the set screws 32, said members can be adjusted so as to vary the size of the feed openings without disturbing the flow of material from the feed box to the compression rolls. By loosening the set screws 32 and swinging arms 33 into out-of-the-way positions, the plates 30 can be readily removed, thereby permitting the ready inspection of the feed of the material from the box to the pressure rolls.

A material feeding box of my improved construction is comparatively simple, can be readily adjusted to control the feed of material to the pressure rolls, constantly agitates the material within the feed box, and moves said material toward the outlet openings thereby providing a continuous and uniform feed of material to the briquet press.

It will be readily understood that minor changes in the size, form and construction of the various parts of my improved material feeding box may be made and substituted for those herein shown and described, without departing from the spirit of my invention, the scope of which is set forth in the appended claims.

I claim:

1. In a material feeder for briquet machines, a box provided with an outlet opening, and a chute leading from said opening, said chute comprising a relatively fixed end wall, a detachably mounted end wall, and a pair of side walls disposed between said end walls, which side walls are adjustable so as to vary the size of the opening through said chute.

2. In a material feeder for briquet machines, a box provided with an outlet opening at one side of its bottom, a wall depending from said box at the inner end of said opening, adjustable members arranged on the exterior of said box to the sides of said opening, the inner ends of which adjustable members bear against said wall, and a removable plate adapted to engage the outer ends of said adjustable members.

3. In a material feeder for briquet machines, a box provided with an outlet opening at one side of its bottom, a wall depending from said box at the inner end of said opening, adjustable members arranged on the exterior of said box to the sides of said opening, the inner ends of which adjustable members bear against said wall, a removable plate adapted to engage the outer ends of said adjustable members, and means for locking said plate in position against the ends of said adjustable members.

4. In a material feeder for briquet machines, a box provided with an outlet opening at one side of its bottom, a wall fixed to said box and depending from the inner end of said opening, members positioned to the sides of said opening, the inner ends of which members bear against said wall, and means for adjusting the position of each member.

5. In a material feeder for briquet machines, a box provided with an outlet opening at one side of its bottom, a wall fixed to said box and depending from the inner end of said opening, members positioned to the sides of said opening, the inner ends of which members bear against said wall, means for adjusting the position of each member, and a removable plate adapted to engage the outer ends of said members.

6. In a material feeder for briquet machines, a box provided with an outlet opening in its bottom, which opening is shorter than the box, a shaft arranged for operation in said box, material stirring members carried by said shaft and disposed above the discharge opening, and paddles carried by the shaft and disposed so as to move the material within said box toward the stirring members and discharge opening.

7. In a material feeder for briquet machines, a box provided with an outlet opening in its bottom, which opening is shorter than the box, a shaft arranged for operation in said box, material stirring members carried by said shaft and disposed above the discharge opening, paddles carried by the shaft and disposed so as to move the material within said box toward the stirring members and discharge opening, and a scraper carried by said shaft and adapted to engage the inner face of the end wall of the box.

8. In a material feeder for briquet machines, a box the bottom of which is provided adjacent to its ends with discharge openings, a shaft arranged for operation in said box, stirring arms carried by said shaft and disposed above each discharge opening, and paddles carried by the shaft between said stirring arms, which paddles are disposed so as to force the material within said box toward the stirring arms and discharge openings.

9. In a material feeder for briquet machines, a box the bottom of which is provided adjacent to its ends with discharge openings, a shaft arranged for operation in said box, stirring arms carried by said shaft and disposed above each discharge opening, paddles carried by the shaft between said stirring arms, which paddles are disposed so as to force the material within said box toward the stirring arms and discharge openings, and scrapers carried by the shaft and adapted to engage the inner faces of the end walls of the box.

10. In a material feeder for briquet machines, a box provided at one side of its bottom with a discharge opening, a wall depending from said box at the inner end of said opening, and adjustable means arranged on the exterior of the box for regulating the size of the discharge opening, which adjustable means bears against said depending wall.

11. In a material feeder for briquet machines, the combination with a box having discharge openings formed in its bottom near its ends, of chutes arranged externally of the box around said openings, certain of the walls of which chutes are adjustable so as to vary the size of the openings through said chutes, and means within the box for stirring the material therein and forcing it toward the discharge openings.

In testimony whereof I hereunto affix my signature this 29 day of August, 1918.

GUSTAV KOMAREK.

Witness:
LAURA E. SMITH.

Copies of this patent may be obtained for five cents each, by addressing the "Commissioner of Patents, Washington, D. C."